United States Patent [19]

Iseki

[11] Patent Number: 5,593,521
[45] Date of Patent: Jan. 14, 1997

[54] PNEUMATIC TIRE INCLUDING CORD LAYERS

[75] Inventor: Tsutomu Iseki, Fukushima-ken, Japan

[73] Assignee: Sumtiomo Rubber Industries, Ltd., Hyogo-ken, Japan

[21] Appl. No.: 223,755

[22] Filed: Apr. 6, 1994

Related U.S. Application Data

[62] Division of Ser. No. 7,956, Jan. 22, 1993, abandoned, which is a division of Ser. No. 651,585, Feb. 6, 1991, abandoned.

[30]  Foreign Application Priority Data

Feb. 15, 1990  [JP]  Japan .................................. 2-13911 U
Feb. 19, 1990  [JP]  Japan .................................. 2-15468 U

[51] Int. Cl.⁶ .............................. B60C 9/30; B60C 115/00
[52] U.S. Cl. ...................... 152/209 R; 152/455; 152/526; 152/534
[58] Field of Search .......................... 152/209 R, 209 A, 152/455, 456, 526, 531, 534, 535

[56]  References Cited

U.S. PATENT DOCUMENTS

| | | | |
|---|---|---|---|
| 3,057,392 | 10/1962 | Nallinger | 152/361 |
| 3,231,000 | 1/1966 | Massoubre | 152/361 |
| 3,254,693 | 6/1966 | Travers | 152/209 R |
| 3,677,319 | 7/1972 | Mirtain | 152/361 |
| 3,782,438 | 1/1974 | Mirtain | 152/209 R |
| 3,834,439 | 9/1974 | Mirtain | 152/361 FP |
| 3,881,492 | 5/1975 | Mirtain | 152/455 |
| 4,173,991 | 11/1979 | Mirtain | 152/209 D |
| 4,244,415 | 1/1981 | Peter et al. | 152/209 R |
| 4,799,523 | 1/1989 | Kawajiri | 152/535 |
| 4,819,704 | 4/1989 | Misawa et al. | 152/209 R |
| 4,840,210 | 6/1989 | Kukimoto | 152/209 A |
| 4,884,607 | 12/1989 | Mori | 152/209 R |
| 4,924,927 | 5/1990 | Kawabata et al. | 152/531 |
| 5,007,974 | 4/1991 | Maathuis et al. | 152/538 |
| 5,044,414 | 9/1991 | Ushikubo | 152/209 R |
| 5,385,187 | 1/1995 | Kajiwara et al. | 152/526 |

FOREIGN PATENT DOCUMENTS

| | | |
|---|---|---|
| 256794 | 2/1988 | European Pat. Off. . |
| 414470 | 2/1991 | European Pat. Off. . |
| 1342822 | 10/1963 | France . |
| 2211687 | 9/1972 | Germany . |
| 2521512 | 11/1975 | Germany ................ 152/455 |
| 122008 | 6/1986 | Japan . |
| 17102 | 1/1988 | Japan . |
| 275405 | 11/1988 | Japan ................ 152/526 |
| 1148116 | 4/1969 | United Kingdom . |

*Primary Examiner*—Steven D. Maki
*Attorney, Agent, or Firm*—Birch, Stewart, Kolasch & Birch, LLP

[57]  ABSTRACT

A pneumatic tire comprises: a carcass extending between bead portions of the tire; a belt reinforcement layer disposed radially outside the carcass and including at least one cord ply extending between tread edge portions to reinforce a substantially full width of the tread portion; and a cord layer disposed radially outside the belt reinforcement layer and having a width narrower than that of the belt reinforcement layer, wherein the cord layer is disposed beneath a rib defined between circumferentially extending grooves to reinforce the rib, or the cord layer is disposed asymmetrically with respect to the tire equator to provide a asymmetrical reinforcement for the tread.

3 Claims, 7 Drawing Sheets

PNEUMATIC TIRE INCLUDING CORD LAYERS

This application is a divisional of application Ser. No. 08/007,956, filed on Jan. 22, 1993, now abandoned which is a divisional application of Ser. No. 07/651,585 filed Feb. 6, 1991, now abandoned.

The present invention relates to a belted pneumatic tire having a belt reinforcement disposed radially outside the carcass to reinforce the tread portion of the tire and a cord layer disposed radially outside the belt reinforcement to adjust the characteristics of the tire.

In general, radial ply tires are provided with a belt which is disposed radially outside the carcass.

Figure 12:
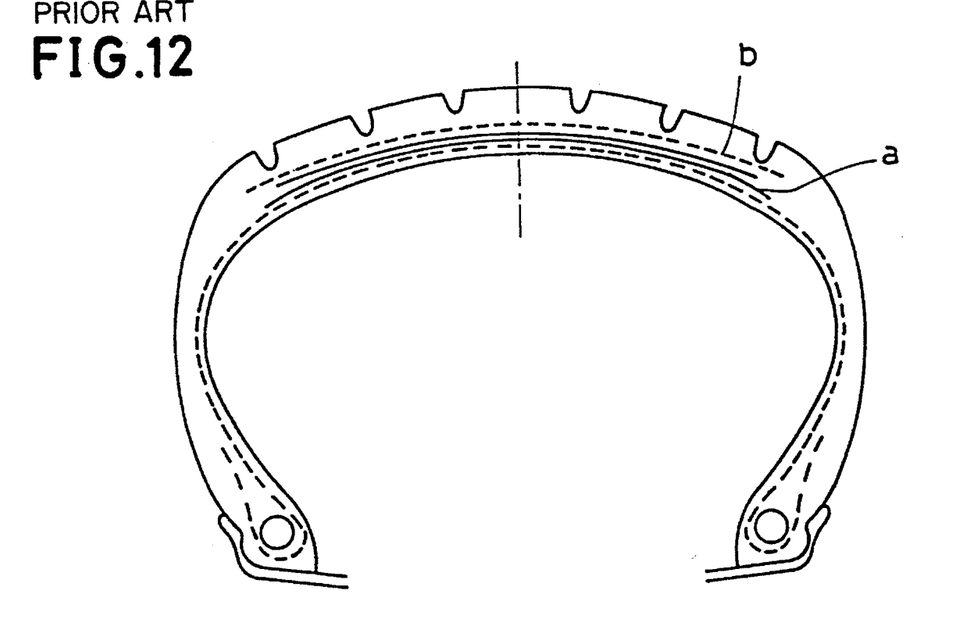
FIGS. 12 and 13 are sectional views showing the conventional belt structures.
Figure 13:
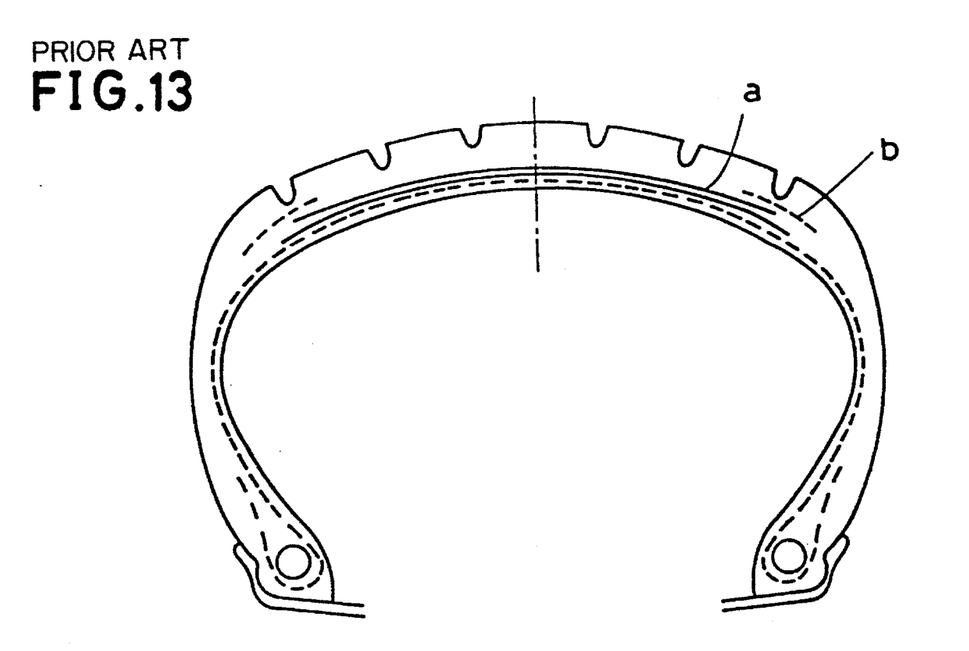

Such a belt, for example as shown in FIGS. 12 and 13, includes a breaker layer (a) disposed on the radially outside of the carcass and a band layer (b) disposed radially outside the breaker layer.

BACKGROUND OF THE INVENTION

In this invention, the breaker layer is composed of at least one ply of parallel cords, which ply extends across the whole width of the tread width and the breaker cords are inclined with respect to the tire equator. A main purpose thereof is to increase the rigidity of the tread portion. The band layer is also composed of at least one ply of parallel cords laid substantially parallel to or at a relatively smaller angle to the tire equator. A main purpose of the band layer is to provide a hooping effect for the tread portion.

For examples, the following band layers have been known: one extending over the substantially whole width of a breaker layer or the tread width as shown in FIG. 12; one composed of a pair of axially spaced plies disposed at the axial edge portions of the breaker layer as shown in FIG. 13 to prevent separation of the breaker edge from the surrounding rubber; and one having edge portions folded to wrap the breaker edges therein to prevent separation of the breaker ply edges.

On the other hand, in order to improve various characteristics of the tire, e.g. road grip, drainage, running stability and the like, the tires are provided with grooves to form rib type tread patterns, block type tread patterns and the like, and tread elements, such as ribs or blocks are provided with sipes, if required.

In the conventional pneumatic tires, the above-mentioned band layers are disposed symmetrically with respect to the tire equator, regardless of the positions of the tread grooves and sipes, in order to reinforce the tread portion of the tire.

However, lateral grooves and sipes extending across a rib, decrease partially the rigidity of the tread, and as a result the tread element, the rib or divided rib moves easily, and uneven wear is apt to be caused. Therefore, it is preferable to adjust the rigidity of the tread portion according to the tread pattern and also the sizes and shapes of the tread elements.

SUMMARY OF THE INVENTION

It is therefore, an object of the present invention to provide a pneumatic tire, in which defects derived from the tread pattern, e.g. uneven wear, are avoided or compensated by disposing one or more narrow width cord layers radially outwards of the belt reinforcement.

Further, when the lateral grooves and/or sipes are inclined at a bias angle to the tire axial direction, for example to reduce tire noise, and when the tread pattern is of an asymmetrical pattern such that all of the lateral grooves are laid in the same direction, for example to improve the drainage performance of the tire, the rigidity of the tread elements and pattern is altered by the measuring direction, and a difference in dynamic performance, e.g. cornering force is generated between the turning directions of the vehicle: left turn and right turn, and sometimes, the shape of the ground contacting region and the ground pressure distribution is disturbed.

Incidentally, even if the tread pattern is symmetrical, such a difference in dynamic tire performance may be generated by a ply-stir phenomenon in the cords of the radially outermost belt ply.

It is therefore, another object of the present invention to provide a pneumatic tire, in which tire characteristics depending upon the tread pattern, tire construction, tire profile and the like are adjusted by disposing one or more narrow width cord layers radially outwards of the belt reinforcement asymmetrically with respect to the tire equator.

According to one aspect of the present invention, a pneumatic tire comprises a tread portion, a pair of bead portions, a pair of sidewall portions, a pair of bead cores disposed one in each bead portions, a carcass extending between the bead portions and turned up around the bead cores, and a belt reinforcement layer including at least one ply of parallel cords disposed radially outside the carcass in the tread portion, the tread portion provided with circumferential grooves extending circumferentially of the tire in parallel with the tire equator to divide the tread portion into ribs, wherein a cord layer is disposed radially outside the belt reinforcement layer and beneath at least one of the ribs, and the cord layer has a narrow width such that each edge thereof does not extend over, in the axial direction of the tire, one of the sidewalls of each of the circumferential grooves defining the rib therebetween, which sidewall is opposed to the side of the rib (or the other sidewall forming the side of the rib).

According to another aspect of the present invention, a pneumatic tire comprises a tread portion, a pair of bead portions, a pair of sidewall portions, a pair or bead cores disposed one in each bead portions, a carcass extending between the bead portions and turned up around the bead cores, and a belt reinforcement layer including a ply of parallel cords disposed radially outside the carcass in the tread portion, wherein a cord layer having a construction which is asymmetrical with respect to the tire equator is disposed radially outside the belt reinforcement.

BRIEF DESCRIPTION OF THE DRAWINGS

Embodiments of the present invention will now be described in detail with reference to the accompanying drawings, in which.

In FIGS. 1–11, each of pneumatic tires 1 of the present invention has a pair of axially spaced bead portions 4, a tread portion 2, and a pair of sidewall portions 3 extending between the tread edges and the bead portions. Each tire 1 comprises a pair of bead cores 5 disposed one in each of the bead portions, a carcass 6 extending between the bead portions and turned up around the bead cores, and a belt layer 7 disposed radially outside the carcass in the tread portion.

The carcass 6 comprises at least one ply of radially arranged cords, and each tire 1 is a radial ply tire.

For the carcass cords, inorganic cords e.g. steel cords, or organic fiber cords e.g. polyester, aromatic polyamide, nylon and the like may be used.

The belt layer 7 comprises at least one ply of parallel cords to reinforce the tread portion of the tire and also to provide a hoop effect.

For the belt cords, inorganic cords e.g. steel cords, or organic fiber cords e.g. polyester, aromatic polyamide, nylon and the like may be used.

In each embodiment, the belt layer comprises two plies: a radially inner ply and a radially outer ply. The belt cords in each ply are laid at a small angle with respect to the tire equator so as to cross the belt cords of the radially adjacent ply.

The tread portion 2 is provided with a plurality of circumferential grooves extending circumferentially of the tire In each of the embodiments shown in the figures, six circumferential grooves G1, G2 and G3 (from the tire equator C0 to each tread edge) are formed to define one central rib R1 between the circumferential grooves G1 and G1, two middle ribs R2 between the circumferential grooves G1 and G2, and two side ribs R3 between the circumferential grooves G2 and G3.

The circumferential grooves G1–G3 in each embodiment are formed in a straight configuration, but those grooves may be formed in a different configuration, e.g. a zigzag configuration, a wavy configuration and the like.

In the figures, references: G1a, G2a and G3a indicate the axially inner side walls of the circumferential grooves G1, G2 and G3, respectively, and references: G1b, G2b and G3b indicate the axially outer side walls of the circumferential grooves G1, G2 and G3, respectively.

FIGS. 1–5 shows embodiments according to the first aspect of the present invention.

Figure 1:
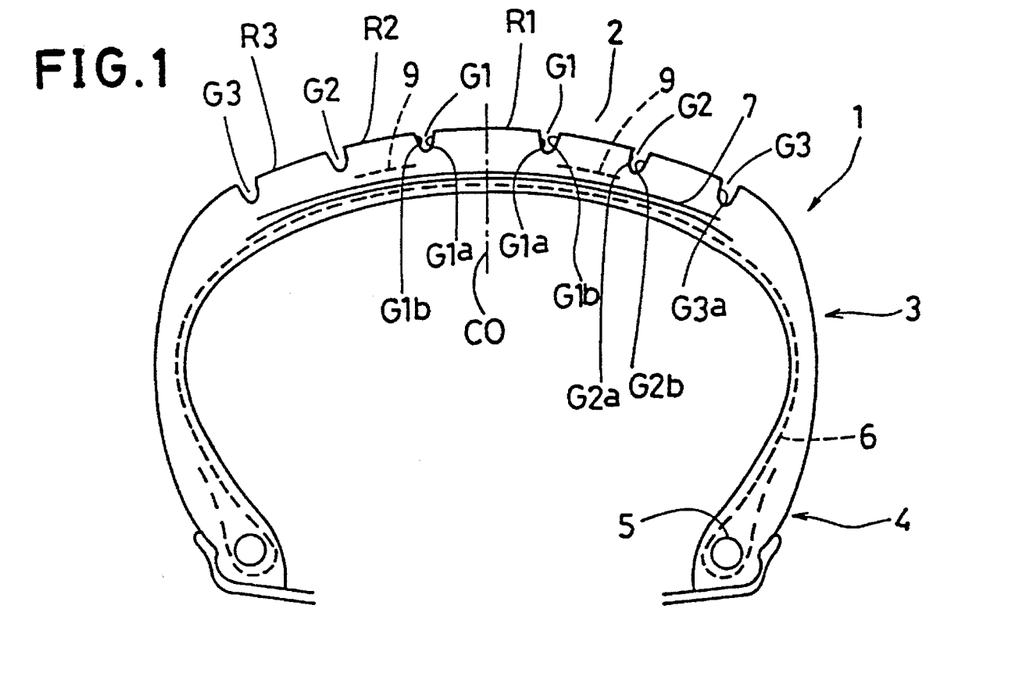
FIG. 1 is a sectional view showing an embodiment of the present invention.
Figure 2:
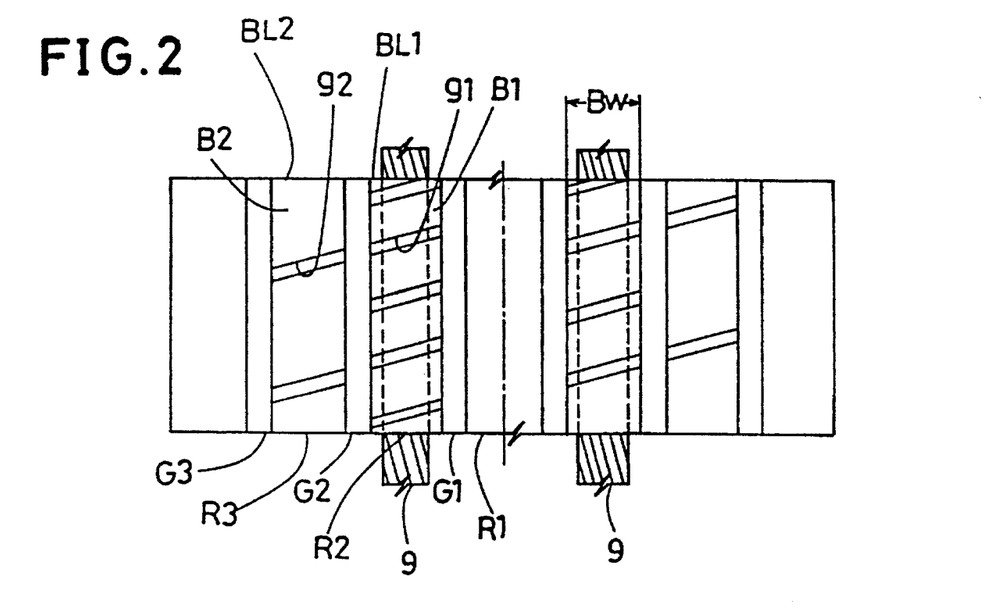
FIG. 2 is a partial plan view showing the tread pattern thereof.

In FIGS. 1 and 2, the ribs R2 and R3 are provided with lateral grooves g1 and g2.

The lateral grooves g1 and g2 are circumferentially spaced apart from each other, and extend across the whole width of the respective ribs R2 and R3 at an inclination angle with respect to the tire equator C0 so as to divide each rib into blocks, whereby a row BL1 of blocks B1 is formed between the circumferential groove G1 and G2, and a row BL2 of blocks B2 is formed between the circumferential groove G2 and G3.

The circumferential pitches of the lateral grooves g1 are shorter than those of the lateral grooves g2, that is, the circumferential lengths of the blocks B1 are shorter than those of the blocks B2.

In general, uneven wear is apt to occur in the shorter blocks B1 rather than the longer blocks B2. Therefore, a cord layer 9 is disposed beneath each of the middle block rows BL1 but not beneath the side block rows BL2 and the central rib R1.

As explained above, the cord layer 9 is to avoid or compensate for a defect on the tire performance derived from the tread pattern.

Each of the cord layers 9 is composed of one ply of reinforcing cords, but it may be composed of plural plies.

For the reinforcing cords, high modulus cords, e.g. steel cords or aromatic polyamide fiber cords are preferably used, but ordinary tire cords made of nylon, polyester, rayon fibers or the like can be used.

The cord angles, at which the reinforcing cords of the cord layer are laid, are set in the range of from 0 to about 60 degrees to the tire equator according to the tread pattern. In this embodiment, the reinforcing cords are laid at an angle so as to make an almost right angle with respect to the direction of the lateral grooves.

The cord layer 9 in this embodiment has an axial width narrower than the axial width Bw of the block B1, and the edges thereof do not protrude, in the axial direction of the tire, beyond the sides of the blocks or the groove sidewalls G1b and G2a, whereby the tread is reinforced in a portion beneath each of the block rows BL1, and movements of the blocks B1 are suppressed, and uneven wear of the blocks such as heel/toe wear are prevented.

Further, in this embodiment in which the lateral grooves g1 have a right side upward inclination, the reinforcing cords are preferably arranged to have an opposite left side upward inclination, whereby a decrease in block rigidity in a direction at a right angle to the oblique sides of the blocks B1 formed by the lateral grooves g1 is prevented. As the result, it becomes possible to adjust cornering force and alignment torque which are apt to be disturbed by such a diamond-shape of the blocks. The cord layer is also advantageous to prevention of a pressed deformation of the blocks during cornering of the vehicle, which improves the ground contact and thereby improves stability during cornering.

Figure 3:
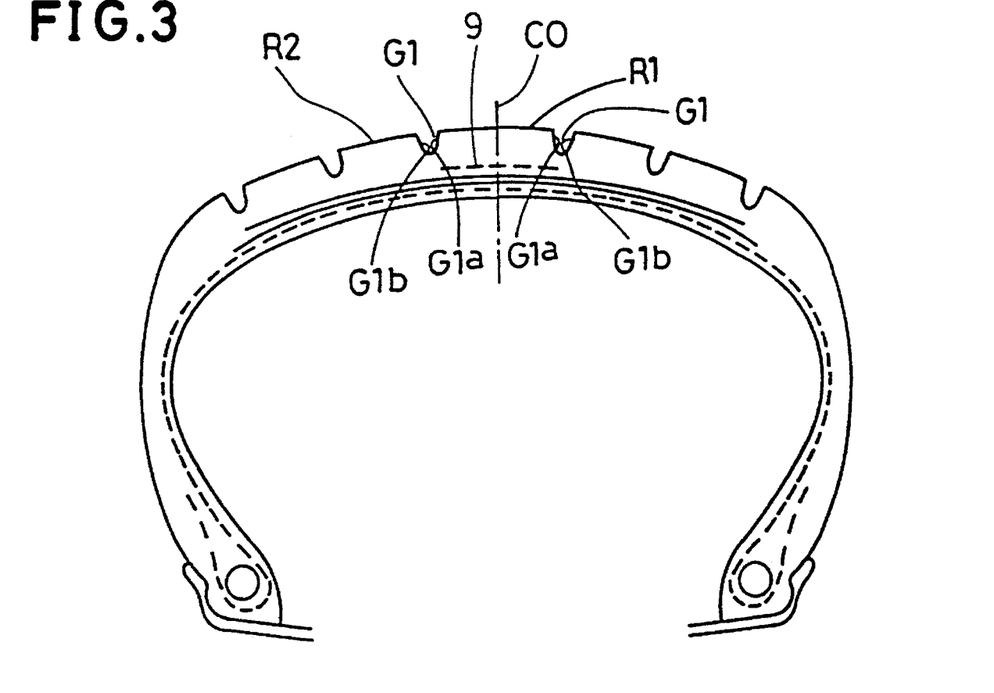
FIG. 3 is a sectional view showing another embodiment of the present invention.
Figure 4:
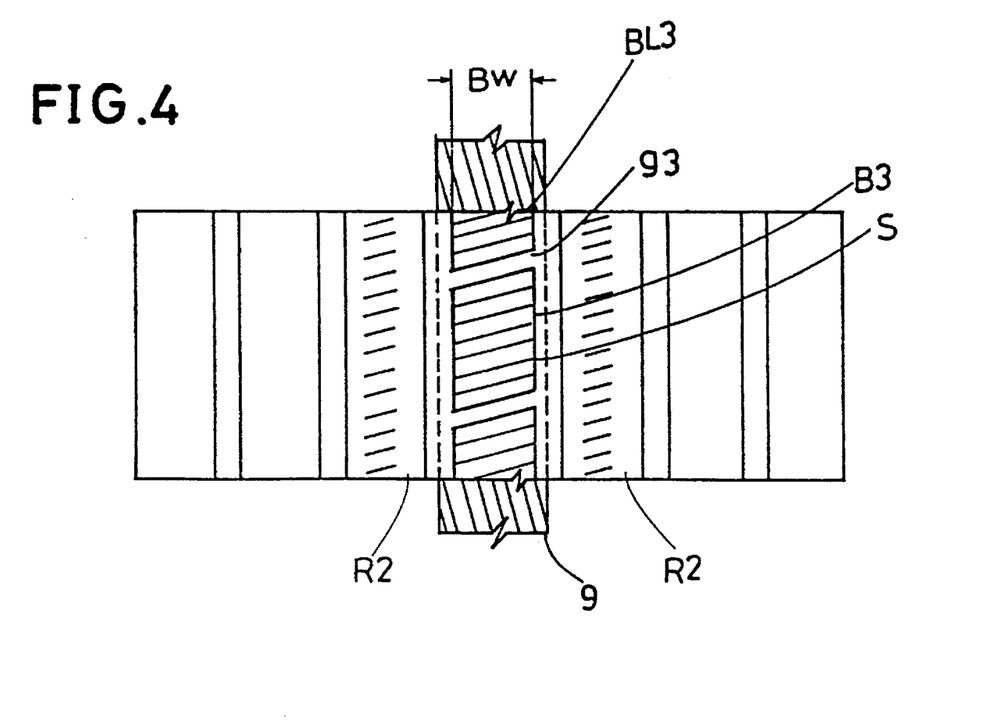
FIG. 4 is a partial plan view showing the tread pattern thereof.

In FIGS. 3 and 4, the central rib R1 is provided with lateral grooves g3 extending across the whole width thereof at an inclination angle with respect to the tire equator C0, whereby a row BL3 of central blocks B3 is formed along the tire equator C0 between the circumferential grooves G1 and G1. The blocks B3 are each provided with sipes S inclined in the same direction as the lateral grooves g3 and extending across the whole width of the block. Further, the middle ribs R2 are provided with sipes of which ends are terminated within the respective ribs.

In this embodiment, a cord layer 9 is disposed beneath only the central block row BL3. The width of the cord layer 9 is wider than the width Bw of the central blocks B3, but the edges thereof are not extended axially outwardly over the groove sidewalls G1b.

Similarly to the first embodiment shown in FIGS. 1 and 2, the cord layer 9 is composed of one ply or reinforcing cords, but it may be composed of plural plies.

For the reinforcing cords, high modulus cords, e.g. steel cords or aromatic polyamide fiber cords are preferably used, but ordinary tire cords made of nylon, polyester, rayon fibers or the like can be used.

The reinforcing cords are laid at an angle so as to make a right angle with respect to the direction of the lateral grooves g3.

Figure 5:
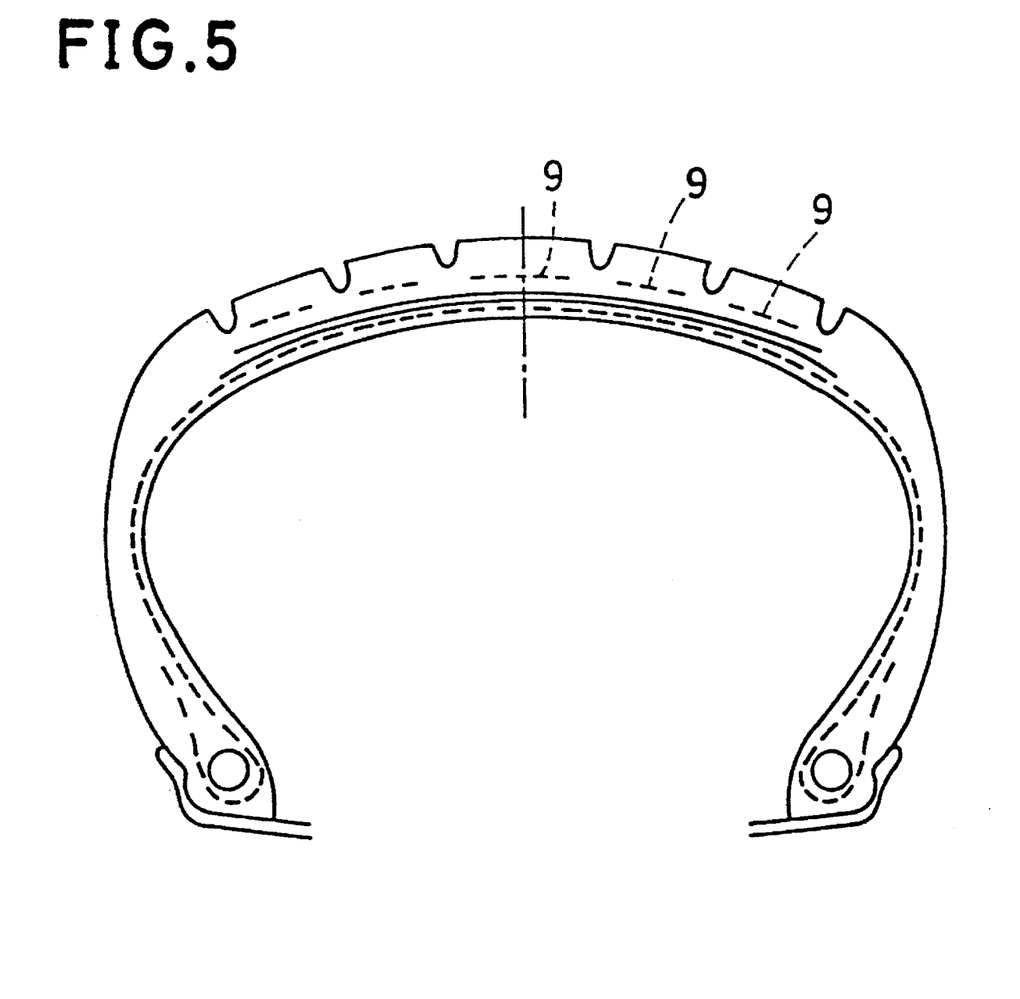
FIG. 5 is a sectional view showing still another embodiment of the present invention.

In FIG. 5, five cord layers 9 are disposed, one beneath each of the central, middle and side ribs, and the widths of the cord layers are narrower than the respective rib width.

According to the first aspect of the present invention, a cord layer is disposed beneath the specific rib, whereby it becomes possible to reinforce effectively only the specific rib to increase the rigidity thereof. Therefore, movement of the rib or blocks when divided is reduced to prevent uneven wear, and tire characteristics depending upon the tread pattern, e.g. cornering force, can be altered to improve running performance.

Further, when the inclination angle of the lateral grooves is large, alignment torque is liable to increase, which impairs directional stability of the vehicle. The cord layer can adjust the alignment torque to improve directional stability.

Next, FIGS. 6–11 show embodiments according to the second aspect of the present invention in which one or more cord layers 19 are disposed asymmetrically with respect to the tire equator C0.

Figure 6:
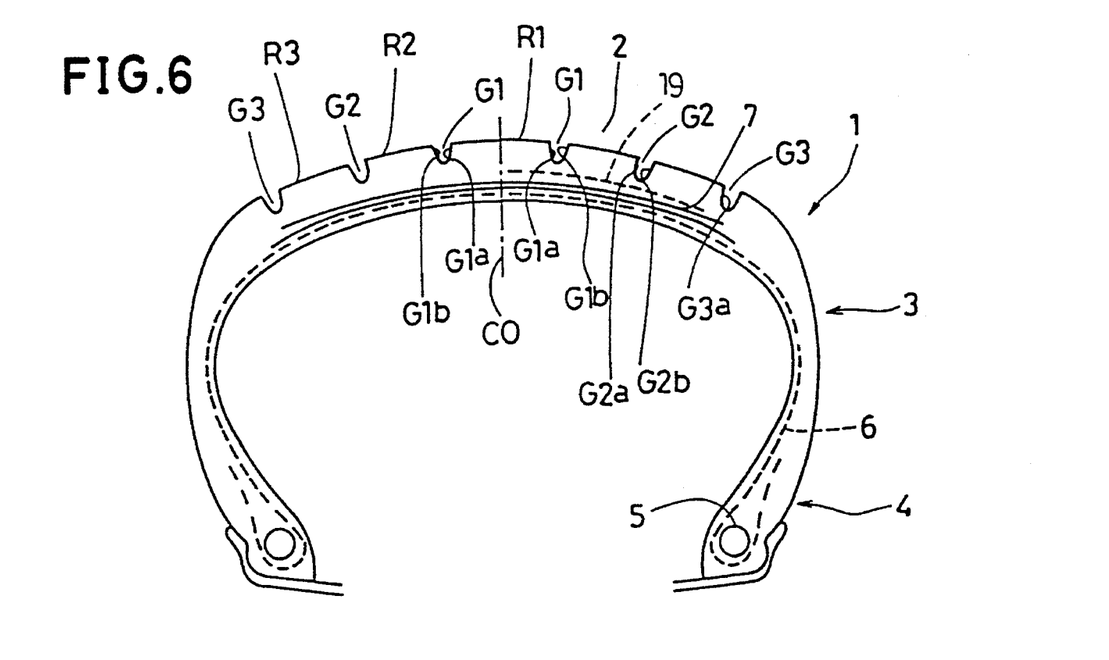
FIG. 6 is a sectional view showing a further embodiment of the present invention.
Figure 7:
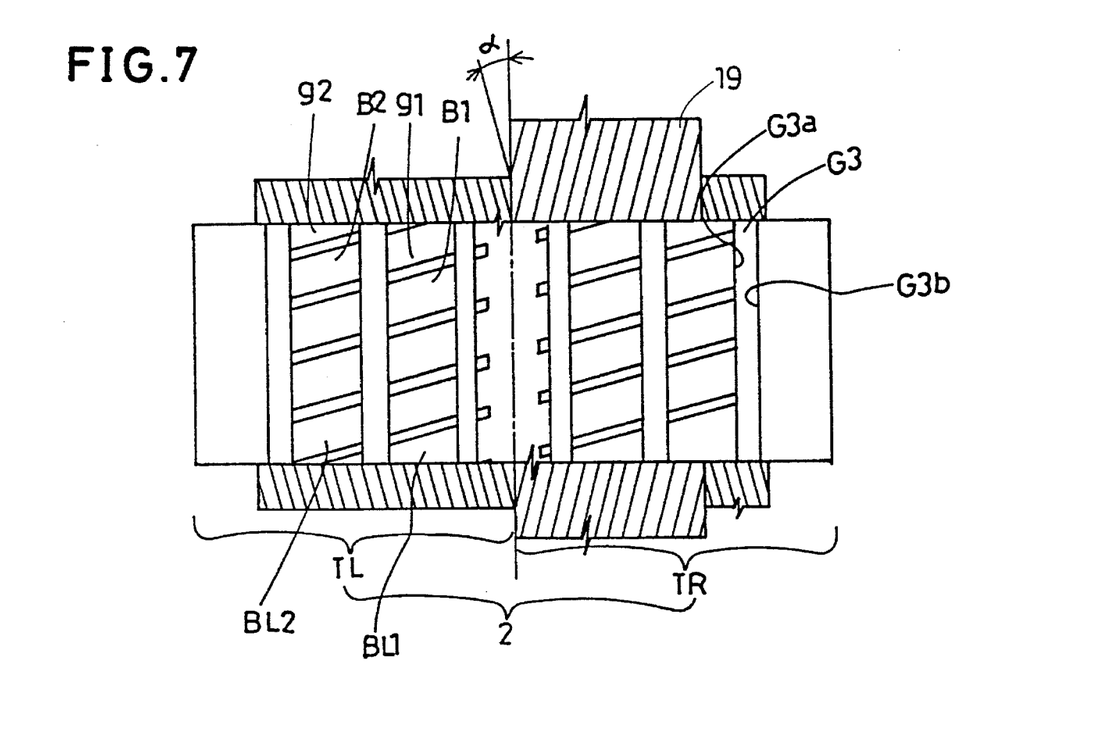
FIG. 7 is a partial plan view showing the tread pattern thereof.

In FIGS. 6 and 7, the ribs R2 and R3 are provided with lateral grooves g1 and g2.

The lateral grooves g1 and g2 are circumferentially spaced apart each other, and extend across the whole width of the respective ribs R2 and R3 at an inclination angle with respect to the tire equator C0 so as to divide each rib into blocks, whereby a rosy BL1 of blocks B1 is formed between the circumferential grooves G1 and G2, and a row BL2 of blocks B2 is formed between the circumferential grooves G2 and G3.

As shown in FIG. 7, all of the lateral grooves g1 and g2 this embodiment have a right side upward inclination, therefor the tire has an asymmetrical tread pattern with respect to the tire equator, and the cords of the radially outer ply of the belt 7 are arranged at an inclination angle of 3 to 30 degrees to the tire equator to have a left side upward inclination.

The tread portion 2 is provided with a cord layer 19 on one side, right side TR of the tire equator C0, but not on the other left side TL. The cord layer 19 is disposed in the tread portion asymmetrically with respect to the tire equator, and the layer is extended from the tire equator C0 to a position near the above-mentioned axially inner groove side wall G3a, thereby increasing the thickness of the tread reinforcement and stiffness of the right side part TR of the tread portion 2. As a result, the dynamic loaded tire diameter is increased in the right side part TR or the left side part TL of the tread according to the construction thereof or the cord material, which generates a conicity. When extensible cords are used for the cord layer, the dynamic loaded tire diameter will be increased in the right side part TR. However, when pull-resistant cords, e.g. steel or aromatic polyamide cords are used for the cord layer, the dynamic loaded tire diameter will be increased in the left side part TL.

The reinforcing cords can be laid in accordance with the use or the tire for example at an angle of 0 to 60 degrees with respect to the tire equator.

Figure 8:
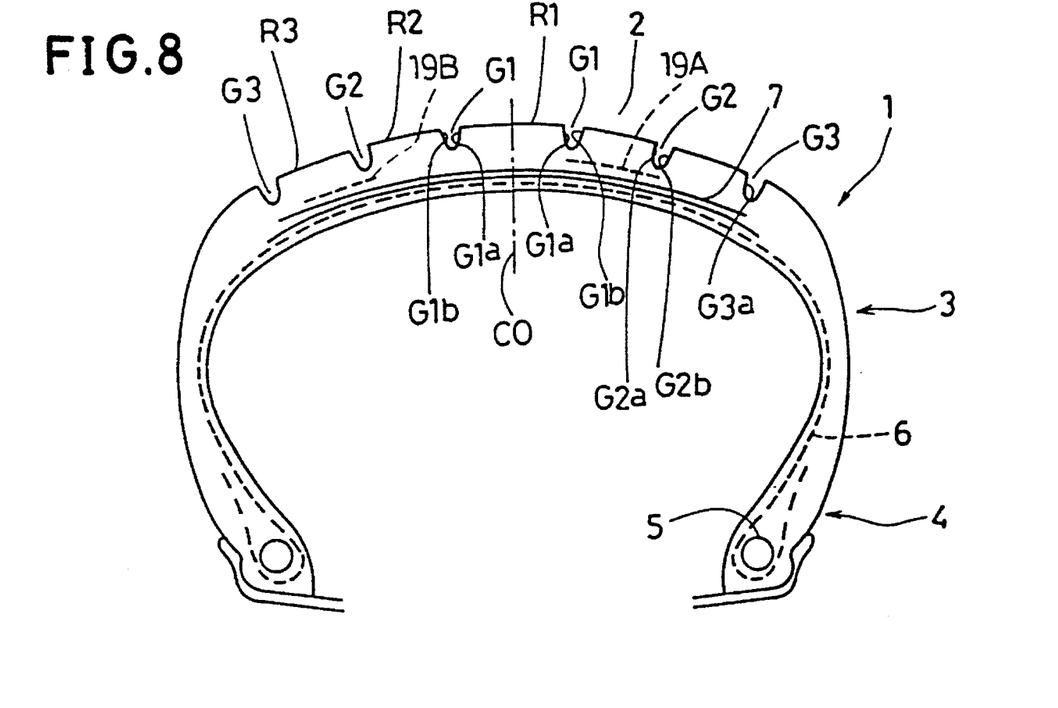
FIG. 8 is a sectional view showing a still further embodiment of the present invention.
Figure 9:
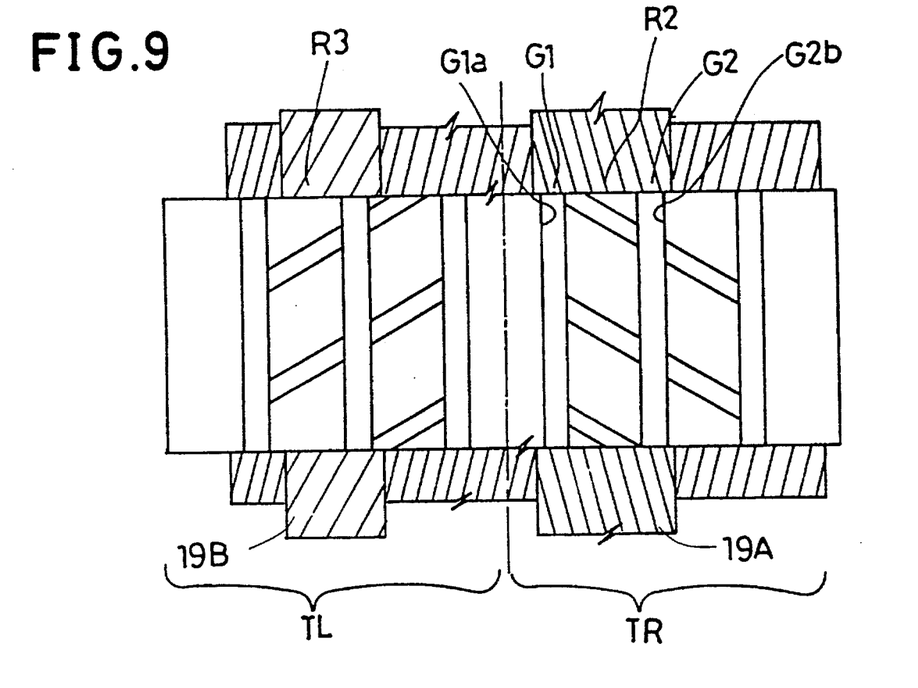
FIG. 9 is a partial plan view showing the tread pattern thereof.

In FIGS. 8 and 9, the tread portion 2 is provided with lateral grooves symmetrically with respect to the tire equator so that the tire 1 has a symmetrical tread pattern with respect to the tire equator.

In the right side tread part TR, there is disposed a cord layer 19A centered on the middle rib R2 (an axially inner rib), and the edges thereof are extended over the axially inner side wall G1a of the circumferential groove G1 and the axially outer side wall G2b of the circumferential groove G2, respectively.

In the left side tread part TL, there is disposed a cord layer 19B having one edge and another edge positioned such that the cord layer 19B extends between a position beneath the middle rib R2 (an axially inner rib) and a position beneath the side rib R3 (an axially outer rib) across the groove G2.

The cord inclination of the cord layer 19A differs from that of the cord layer 19B such that the cord layer 19A has a left side upward inclination, and the cord layer 19B has a right side upward inclination.

Figure 10:
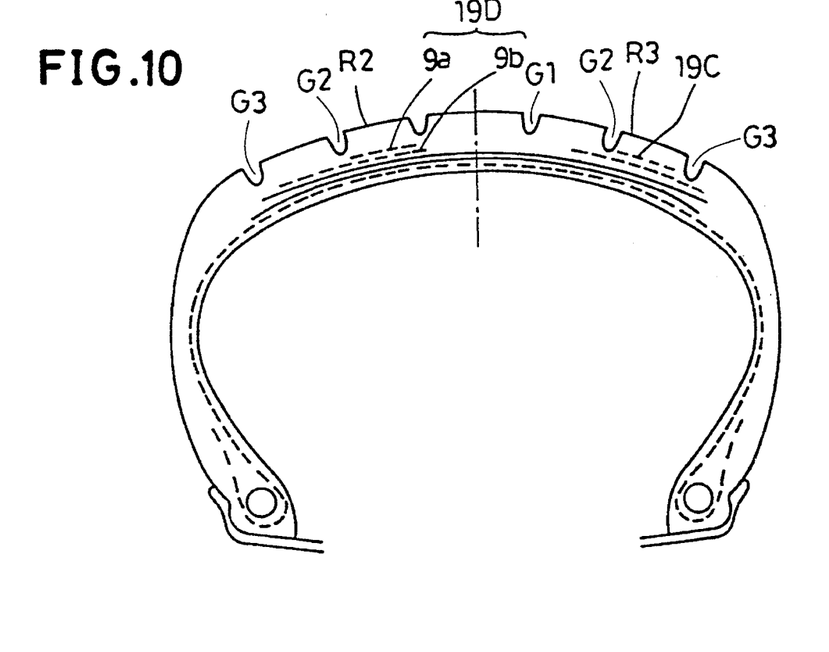
FIG. 10 is a sectional view showing still another embodiment of the present invention.
Figure 11:
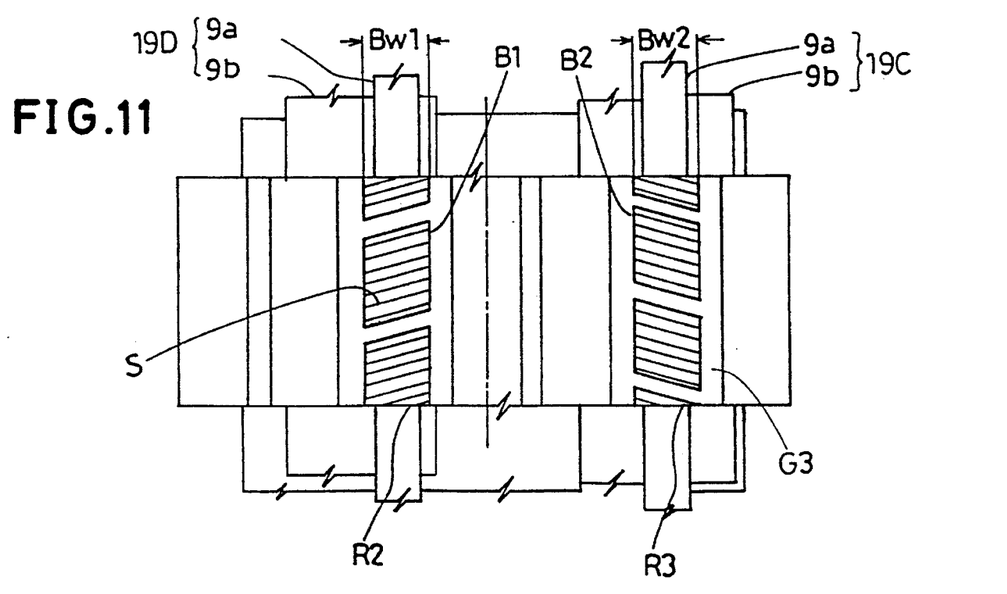
FIG. 11 is a partial plan view showing the tread pattern thereof.

In FIGS. 10 and 11, the middle rib R2 on the left side is provided with straight lateral grooves to be divided into blocks B1, and the side rib R3 on the right side is provided with straight lateral grooves to be divided into blocks B2, whereby the tire 1 has an asymmetrical tread pattern. Each of the blocks B1 and B2 is provided with straight sipes S inclined in the same direction as the lateral grooves. Beneath the divided ribs R2 and R3, two cord layer'is 19D and 19C are respectively disposed.

Each cord layer 19C and 19D comprises a narrow ply 9a and a wide ply 9b disposed radially inside the narrow ply 9a. The axial width of the radially outer ply 9a of the cord layer 19C is narrower than the axial width Bw2 of the blocks B2. The axial width of the radially outer ply 9a of the cord layer 19D is narrower than the axial width Bw1 of the blocks B1.

The radially outer plies 9a are centered on the respective ribs in the tire axial direction to increase the rigidity of the blocks B1 and B2.

The radially inner wide plies 9b are disposed asymmetrically with respect to the tire equator such that the ply 9b of the cord layer 19C is extended between a position axially outward of the groove G3 and a position axially inward of the groove G2, and the ply 9b of the cord layer 19D is extended between a position beneath the groove G1 and a position axially outward of the groove G2.

In a case that the camber angle for the tire is set at or a very small value instead or setting it at a larger value to generate a camber thrust or a camber torque, it is preferable generate a conicity force (COF) and a conicity torque (COT) with the purpose of obtaining a required camber thrust and camber torque.

By disposing the cord layer asymmetrically of the tire equator, a difference in rigidity and a difference in tread thickness are made, which provide a conicity for the tire, and thereby a conicity force (COF) and a conicity torque (COT) which can prevent an imbalance in handling of the vehicle and can compensate a defect due to a ply-stir in the outermost belt ply, are generated.

When the tires are provided with such a conicity as described above, the tires are installed on the vehicle such that the larger diameter side of each tire is located outward of the vehicle or inward of the vehicle, that is, symmetrically with respect to the center line of the vehicle, whereby the COF and COT of the tire on one side and those on the other side of the vehicle are canceled with respect to each other.

When the cord layer is disposed on only one side of the tire equator as shown in FIGS. 6–7, this side is preferably located outward of the vehicle, whereby the outward side of the tire which is subjected to a larger deformation than the inward side of the tire during cornering is reinforced, and the ground contacting area is increased. As a result cornering performance is improved.

In the tire having an asymmetrical tread pattern, the cord layer can be disposed to decrease the difference in cornering force between the right turn and left turn, and thereby to improve cornering performance and directional stability.

As described above, according to the second aspect of the present invention, the cord layer is disposed asymmetrically with respect to the tire equator. Therefore, a difference in rigidity and/or thickness of the tread portion is made between the right side and left side of the tire equator, and the dynamic performance of the tire can be improved.

Incidentally, an asymmetrical reinforcement to the tread portion can be made by changing the cord thickness, cord direction, cord angle and cord count between the right side and left side of the tire equator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire comprising a tread portion, said tread portion having a pair of tread edges, a pair of axially spaced bead portions, a pair of sidewall portions, one of said pair of sidewall portions extending between one of said pair of tread edges and one of said pair of bead portions, a pair of bead cores, one of said pair of bead cores being disposed in one of said bead portions and the other of said bead cores being disposed in the other of said bead portions, a carcass extending between said bead portions and turned up around each of said pair of bead cores, a belt reinforcement layer disposed radially outside said carcass in said tread portion and including at least one ply of parallel cords which ply extends between said tread edges to reinforce a substantially full width of said tread portion, and a first and a second layer of cords disposed radially outside said belt reinforcement layer, each of said first and second cord layers having a width narrower than that of said belt reinforcement layer, wherein said tread portion is provided with a plurality of circumferential grooves extending circumferentially of the tire in parallel with the tire equator, each of said plurality of circumferential grooves having a first and a second sidewall, and dividing said tread portion into a plurality of ribs, said plurality of ribs comprising a pair of axially inner ribs and a pair of axially outer ribs, the axially inner ribs being positioned between the axially outer ribs, said first cord layer is disposed on one side of the tire equator, said second cord layer is disposed on the other side of the tire equator, said two cord layers are disposed axially outward of the tire equator and asymmetrically in axial positions with respect to the tire equator, each of said inner and outer ribs is provided with a plurality of lateral grooves extending across the entire width thereof to divide the rib into a plurality of blocks, said lateral grooves being substantially straight and parallel with each other within each of said inner and outer ribs, said circumferential grooves and said lateral grooves form a tread pattern which is symmetrical with respect to the tire equator, the cords of said first cord layer and lateral grooves located on said one side of the tire equator have a left-side-upward-inclination and the cords of said second cord layer and lateral grooves located on the said other side of the tire equator have a right-side-upward-inclination, and said first cord layer being centered beneath one of said inner ribs and said second cord layer having and edge positioned at one position beneath the other of said inner ribs and another edge positioned at another position beneath the outer rib which is adjacent said other of said inner ribs so that the second cord layer extends between said one position and said another position.

2. The pneumatic tire according to claim 1, wherein said cord layers have different widths.

3. The pneumatic tire according to claim 1, wherein said first cord layer is beneath the sidewalls defining said one of said inner ribs.

* * * * *